United States Patent [19]

DePaul et al.

[11] 4,239,642
[45] Dec. 16, 1980

[54] STABILIZATION OF HALOGENATED POLYOLS FOR POLYURETHANE PRODUCTION

[75] Inventors: Harry V. DePaul, Eddystone, Pa.; John R. Panchak, Wilmington, Del.

[73] Assignee: Air Products and Chemicals, Inc., Allentown, Pa.

[21] Appl. No.: 53,441

[22] Filed: Jun. 29, 1979

[51] Int. Cl.³ .................. C08G 18/14; C08G 18/18; C08G 18/34; C09K 3/00
[52] U.S. Cl. .................. 252/182; 521/110; 521/112; 521/118; 521/128; 521/129; 521/130; 521/171
[58] Field of Search .............. 521/110, 112, 117, 118, 521/130, 129, 171; 528/75; 252/182, 403, 407; 260/45.85 E, 45.9 NC

[56] References Cited

U.S. PATENT DOCUMENTS

| | | | |
|---|---|---|---|
| 2,834,748 | 5/1958 | Bailey et al. | 260/42 |
| 2,917,480 | 12/1959 | Bailey et al. | 260/42 |
| 3,100,759 | 8/1963 | Boussu et al. | 528/75 |
| 3,378,497 | 4/1968 | Lanham | 521/114 |
| 3,448,046 | 6/1969 | Schalin | 521/123 |
| 3,507,815 | 4/1970 | Bailey et al. | 521/112 |
| 3,746,663 | 7/1973 | Beale et al. | 521/137 |
| 3,781,235 | 12/1973 | Trott et al. | 521/137 |
| 3,914,190 | 10/1975 | Carroll et al. | 521/128 |
| 3,980,579 | 9/1976 | Syrop et al. | 252/182 |
| 4,115,300 | 9/1978 | Chakirof | 521/171 |

Primary Examiner—H. S. Cockeram
Attorney, Agent, or Firm—Richard A. Dannells, Jr.; E. Eugene Innis

[57] ABSTRACT

The storage stability of otherwise unstable premix compositions for flame retardant rigid polyurethane foams containing in the premix a chlorinated polyether polyol and a tertiary amine catalyst, is enhanced by incorporation into the premix of a minor amount of a vinyl monomer. The preferred vinyl monomers employed are condensation products of acrylic or methacrylic acid with alcohols or amines. Such stabilization prevents premature deactivation of the tertiary amine catalysts contained in the premix.

11 Claims, No Drawings

STABILIZATION OF HALOGENATED POLYOLS FOR POLYURETHANE PRODUCTION

The present invention relates to formulations for flame retardant rigid polyurethane foams and is particularly concerned with improving the storage stability of the premix composition employed in the production of these foams.

Premix compositions for rigid flame retardant polyurethane foams containing chlorinated polyols, are unstable at room or elevated temperature when such premix also contains a tertiary amine catalyst. Apparently decomposition of the chlorinated polyol gives rise to HCl which forms a tertiary amine hydrochloride salt and deactivates the catalyst.

Among the objects of the present invention, accordingly, is to stabilize such premix compositions and extend the desired useful storage life thereof.

The problem encountered with respect to the poor storage stability of halogenated polyol blends employed in the preparation of fire retardant polyurethane foams is recognized in U.S. Pat. No. 4,115,300.

To overcome the poor storage stability of premix compositions containing such halogenated polyols and a tertiary amine urethane catalyst, it is proposed in said patent to stabilize the composition by addition thereto of particular diepoxide compounds. The use of certain epoxide compounds as stabilizers for fire retardant premix compositions for polyurethane is also disclosed in U.S. Pat. Nos. 3,378,497 and 3,448,046. The use for such stabilization of a sulfur-containing organotin compound is disclosed in U.S. Pat. No. 3,980,579.

In copending application Ser. No. 921,422 filed July 3, 1978, stabilization of flame retardant premix compositions for polyurethane foam is effected by incorporation of a synergistic combination of an organic sulfur compound and an unsaturated carbon compound, preferably one selected from among unsaturated terpenes, unsaturated higher fatty acids, unsaturated higher fatty alcohols and unsaturated polyester alcohols.

SUMMARY OF THE INVENTION

It has now been found, in accordance with the present invention, that the premature deactivation of tertiary amine catalyst contained in the premix for rigid polyurethane foams in the presence of halogenated flame retardant polyols, can be reduced or largely avoided and the useful storage life of such premix extended by inclusion therein of a stabilizing amount of a vinyl monomer. The preferred vinyl monomer for such stabilization is a condensation product of acrylic or methacrylic acid with an alcohol or amine.

Among the esters and amides of acrylic and methacrylic acid found particularly beneficial as such stabilizing agents are those corresponding to one of the formulae:

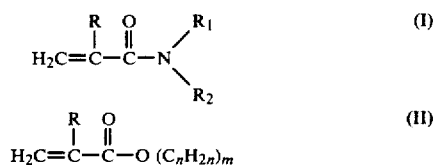

wherein R is H or CH$_3$; R$_1$ is H, an alkyl radical of 1 to 4 carbons, or a hydroxyalkyl radical of 2 to 3 carbons; R$_2$ is an alkyl radical of 1 to 4 carbons, a hydroxy alkyl radical of 2 to 3 carbons, or a substituted amino alkyl group of the formula

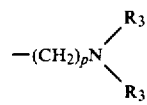

wherein R$_3$ is independently an alkyl radical of 1 to 4 carbons, or a hydroxy alkyl radical of 2 to 3 carbons and p is 2 to 4;

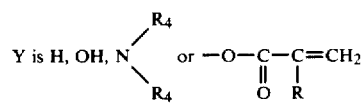

wherein R$_4$ is independently an alkyl radical of 1 to 4 carbons, m is 1 and n is 1 to 12, provided that n is 2 when Y is OH or

B is hydrogen or an alkyl radical of 2 to 4 carbons, r is 3 or 4, t being zero when r is 4 and t being one when r is 3.

Compounds corresponding to the above formulae are commercially available. They may be prepared by generally known methods of esterification or amide formation, respectively.

The premix composition employed in practice of the invention includes in addition to the aforesaid stabilizer for the tertiary amine catalyst and chlorinated polyol, the usual blowing agent and surfactant cell stabilizer. To such premix, the required di- or poly- isocyanate is subsequently added to initiate the isocyanate-polyol reaction and blowing to produce the desired rigid flame retardant cellular polyurethane.

SPECIFIC EMBODIMENTS

The stabilized premix composition of the invention may contain any of the known tertiary amine catalysts employed in the production of rigid cellular polyurethanes or mixtures of such catalysts. Particular examples of these include triethylene diamine, dimethyl ethanolamine, dimethyl cyclohexylamine, triethylamine, N-methyl morpholine, dimethyl piperazine, tetramethyl propane diamine. More frequently employed in flame retardant polyurethane foams are the aliphatic tertiary amines, particularly dimethylethanolamine.

The surfactant employed as a cell stabilizer may be of the silicone oil type such as polysiloxane-polyoxyalkylene block copolymers or polydimethyl siloxane; or the type obtained by polymerization of dibutyl maleate monomer and an N-vinyl pyrrolidone monomer compound in a polyol polymerization medium (U.S. Pat. No. 3,746,663).

Any of the usual blowing agents generally employed in rigid polyurethane formulations may be employed, preferably those of the halohydrocarbon type, such as trichlorofluoromethane.

The halogenated polyol may be a halogenated aliphatic or cycloaliphatic polyester or polyether polyol or mixtures thereof having 2 to 8 hydroxyl groups, there being at least one chlorine or bromine atom attached to a carbon of the polyol. Typical chlorinated polyols more frequently employed in flame retardant polyurethanes are the chlorinated polyether polyols having hydroxyl number values of from about 200 to about 700 and having a chlorine content in the range of about 25 to 60% by weight.

The stabilized premix compositions of the invention can be stored at ambient temperatures for extended periods and retain their useful activity. In the preparation of polyurethane foams the premix composition need only be reacted with an organic di- or poly-isocyanate component, by methods known to the art. Typical isocyanates employed in flame-retardant polyurethane production include: isomeric mixtures of toluene diisocyanates (TDI) and polymethylene polyphenyl-isocyanates.

EXAMPLE 1

A series of experimental runs were made to determine the effectiveness of the stabilizing additives in retarding deactivation of the catalyst in the premix for fire retardant rigid polyurethane foams. In all of these runs the same basic premix composition was employed. The basic premix composition was comprised of:

|  |  | pbw |
|---|---|---|
| Basic Premix: | Thermolin$^{TM}$ RF-230$^{(1)}$ | 100 |
|  | Poly G ®, 70–600$^{(2)}$ | 20 |
|  | Genetron ®, R11SBA$^{(3)}$ | 45 |
|  | Cell stabilizer$^{(4)}$ | 1.5 |
|  | Tertiary amine catalyst | (as indicated) |
|  | Vinyl stabilizers | (as indicated) |
| Isocyanate: | Mondur ® MR$^{(5)}$ | 134 (added later) |

(1) A reactive chlorinated polyether polyol supplied by Olin Corporation Designed Products Division for use in production of flame retardant rigid polyurethanes. The product contains 47% by weight chemically bound chlorine and has a hydroxyl number of 365±10 (mg KOH/gm) and a viscosity of 100,000 cps at 25° C.

(2) An amino-polyol supplied by the above-named Olin Division specifically designed to reduce surface friability in rigid polyurethane foams based on Thermolin RF230. It has a hydroxyl number of 600±10 (mg KOH/gm) and a viscosity of 280 cps at 25° C.

(3) Trichloro monofluoromethane blowing agent.

(4) LK-221$^{TM}$ or DC-193 copolymers were employed. LK-221 copolymer, supplied by Air Products and Chemicals, Inc., is a copolymer of N-vinyl pyrrolidone and dibutyl maleate polymerized in a trifunctional polyol. DC-193, supplied by Dow-Corning comprises polysiloxane-polyoxyalkylene block copolymers as described in U.S. Pat. Nos. 2,834,748 and 2,917,480.

(5) A polymethylene polyphenyl isocyanate supplied by Mobay Chemical Co., containing 32% NCO groups, having an equivalent weight of 132.

Before and after storage of the foregoing premix composition at about 38°–41° C. for indicated time periods, the activity was determined by reaction with the isocyanate. The results are reported in Tables 1 and 2, comparing the vinyl stabilized compositions with an unstabilized control, each employing dimethyl ethanol amine (DMEA) catalyst, 3.5 parts catalyst in stabilized compositions and 3.7 parts in the control.

TABLE 1

| STABILIZER pbw | NONE | | | n-Lauryl Methacrylate 3.0 | | | Dimethyl amino ethyl acrylate 2.0 | | | Trimethylol propane triacrylate 2.0 | | | Triethylene glycol diacrylate 2.0 | | | Hydroxyethyl methacrylate 3.0 | | | Hydroxyethyl methacrylate 4.0 | | |
|---|---|---|---|---|---|---|---|---|---|---|---|---|---|---|---|---|---|---|---|---|---|
|  | a | e | f | a | b | c | a | b | c | a | b | c | a | b | c | a | b | d | a | b | d |
| Cream time (secs.) | 9 | 11 | 16 | 11 | 13 | 13 | 11 | 11 | 11 | 11 | 13 | 13 | 12 | 13 | 14 | 12 | 13 | 13 | 12 | 13 | 14 |
| Gel time (secs.) | 31 | 26 | 49 | 34 | 37 | 38 | 30 | 29 | 30 | 34 | 36 | 38 | 34 | 37 | 39 | 34 | 37 | 37 | 33 | 38 | 40 |
| Tack-free time (secs.) | 43 | 49 | 71 | 39 | 47 | 45 | 34 | 33 | 32 | 41 | 42 | 48 | 37 | 42 | 46 | 37 | 43 | 47 | 39 | 42 | 45 |
| Rise time (secs.) | 59 | 71 | 90 | 78 | 60 | 68 | 63 | 65 | 68 | 78 | 78 | 86 | 72 | 81 | 80 | 75 | 76 | 79 | 73 | 75 | 80 |
| Percent loss |  |  |  |  |  |  |  |  |  |  |  |  |  |  |  |  |  |  |  |  |  |
| Cream time | — | 22 | 78 | — | 18 | 18 | — | 0 | 0 | — | 18 | 18 | — | 8 | 17 | — | 8 | 8 | — | 8 | 17 |
| Gel time | — | 16 | 58 | — | 9 | 12 | — | 0 | 0 | — | 6 | 12 | — | 9 | 15 | — | 8 | 8 | — | 15 | 21 |
| Tack-free time | — | 17 | 65 | — | 21 | 15 | — | 0 | 0 | — | 2 | 17 | — | 14 | 24 | — | 16 | 27 | — | 8 | 15 |
| Rise time | — | 20 | 73 | — | 0 | 0 | — | 3 | 8 | — | 0 | 10 | — | 13 | 11 | — | 1 | 5 | — | 3 | 10 | a initial
b after 11 days
c after 19 days
d after 18 days
e after 8 days
f after 15 days
g after 12 days

TABLE 2

| Stabilizer pbw | None | | | Isobutyl Methacrylate 3.0 | | | Isobutyl Methacrylate 4.0 | | | 1,3-Butylene dimethyacrylate 2.0 | | |
|---|---|---|---|---|---|---|---|---|---|---|---|---|
|  | a | e | f | a | b | d | a | b | d | a | b | d |
| Cream time (secs.) | 9 | 11 | 16 | 13 | 13 | 14 | 13 | 13 | 14 | 12 | 13 | 12 |
| Gel time (secs.) | 31 | 26 | 49 | 34 | 37 | 37 | 34 | 37 | 36 | 33 | 35 | 37 |
| Tack-free time (secs.) | 43 | 49 | 71 | 40 | 44 | 46 | 39 | 43 | 45 | 37 | 43 | 45 |
| Rise time (secs.) | 59 | 71 | 90 | 75 | 82 | 81 | 78 | 71 | 79 | 79 | 75 | 75 |

TABLE 2-continued

| Percent loss | | | | | | | | | | | | | | | |
|---|---|---|---|---|---|---|---|---|---|---|---|---|---|---|---|
| Cream time | — | 22 | 78 | — | 0 | 8 | — | 0 | 8 | — | 8 | 0 | | | |
| Gel time | — | 16 | 58 | — | 9 | 9 | — | 9 | 6 | — | 6 | 12 | | | |
| Tack-free time | — | 17 | 65 | — | 10 | 15 | — | 10 | 15 | — | 16 | 22 | | | |
| Rise time | — | 20 | 73 | — | 9 | 8 | — | 0 | 1 | — | 0 | 0 | | | |

| Stabilizer pbw | Trimethylol Propane trimethacrylate 2.0 | | | 1,6-Hexane diol diacrylate 2.0 | | | Dimethylaminopropyl methacrylamide 2.0 | | | Dimethylaminoethyl methacrylate 2.0 | | | Isobutyl methacrylamide 3.0 | | |
|---|---|---|---|---|---|---|---|---|---|---|---|---|---|---|---|
|  | a | b | d | a | b | d | a | b | d | a | g | c | a | g | c |
| Cream time (secs.) | 12 | 13 | 13 | 12 | 13 | 14 | 11 | 12 | 12 | 11 | 11 | 12 | 13 | 13 | 14 |
| Gel time (secs.) | 33 | 35 | 37 | 34 | 36 | 38 | 27 | 29 | 29 | 28 | 30 | 30 | 34 | 36 | 38 |
| Tack-free time (secs.) | 37 | 44 | 40 | 37 | 44 | 43 | 30 | 34 | 36 | 34 | 35 | 33 | 39 | 43 | 44 |
| Rise time (secs.) | 74 | 71 | 71 | 73 | 78 | 76 | 56 | 58 | 57 | 65 | 60 | 62 | 65 | 74 | 75 |
| Percent loss | | | | | | | | | | | | | | | |
| Cream time | — | 8 | 8 | — | 8 | 17 | — | 9 | 9 | — | 0 | 9 | — | 0 | 8 |
| Gel time | — | 6 | 12 | — | 6 | 12 | — | 7 | 7 | — | 7 | 7 | — | 6 | 12 |
| Tack-free time | — | 19 | 8 | — | 19 | 16 | — | 13 | 20 | — | 3 | 0 | — | 10 | 13 |
| Rinse time | — | 0 | 0 | — | 7 | 4 | — | 4 | 2 | — | 0 | 0 | — | 14 | 15 | a initial
b after 11 days
c after 19 days
d after 18 days
e after 8 days
f after 15 days
g after 12 days The low activity loss demonstrated in the test runs made after high temperature storage to accelerate the rate of activity decline, are indicative that the premix compositions stabilized with the vinyl monomers of Tables 1 and 2 can be successfully used after storage at ambient temperature for prolonged periods of up to about six months.

In addition to the vinyl monomer compounds disclosed in Tables 1 and 2, other examples of compounds corresponding to Formula (I) include:

bishydroxyethylacrylamide
dibutyl acrylamide
diethyl acrylamide

Examples of compounds corresponding to Formula (II) in addition to those specifically named in the Tables above, are:

hydroxyethyl acrylate
hydroxyethyl methacrylate

An example of a compound corresponding to Formula (III) in which r=4, is pentaerythritol tetraacrylate The rapid loss in activity (over 50% loss) shown by the unstabilized control is a common occurrence not only with the DMEA catalyst used in the reported test but also is found with other tertiary amine catalysts when employed in premix compositions containing halogenated polyols. The vinyl stabilizers of the present invention are effective in retarding the rate of loss in activity of fire retardant polyurethane premix compositions employing such other tertiary amine catalysts.

Results of stability tests made on flame retardant polyurethane premix compositions with other tertiary amine catalysts are reported in Tables 3 and 4.

TABLE 3

| STABILIZER (pbw) | NONE | | | 1.0 | | | 3.0 | | | 1.0 | | |
|---|---|---|---|---|---|---|---|---|---|---|---|---|
| CATALYST (pbw) | DMAEM 3.5 | | | DMAEM 3.5 | | | DMAEM 3.5 | | | (a) 2.5 | | |
|  | A | C | E | A | B | D | A | B | D | A | B | D |
| Cream time (secs.) | 9 | 11 | 16 | 10 | 11 | 13 | 10 | 10 | 10 | 11 | 13 | 14 |
| Gel time (secs.) | 31 | 26 | 49 | 32 | 34 | 34 | 30 | 29 | 30 | 30 | 34 | 38 |
| Tack-free time(secs.) | 43 | 49 | 71 | 38 | 38 | 43 | 34 | 32 | 37 | 36 | 42 | 47 |
| Rise time (secs.) | 59 | 71 | 90 | 72 | 74 | 75 | 61 | 68 | 65 | 64 | 73 | 77 |
| Percent loss | | | | | | | | | | | | |
| Cream time | — | 22 | 78 | — | 10 | 30 | — | 0 | 0 | — | 18 | 27 |
| Gel time | — | 16 | 58 | — | 6 | 6 | — | 0 | 0 | — | 13 | 27 |
| Tack-free | — | 18 | 65 | — | 0 | 13 | — | 0 | 9 | — | 17 | 31 |
| Rise time | — | 20 | 73 | — | 3 | 4 | — | 11 | 17 | — | 14 | 20 |

| STABILIZER (pbw) | DMAEM 5.0 | | | DMAEM 1.0 | | | DMAEM 3.0 | | | DMAEM 5.0 | | |
|---|---|---|---|---|---|---|---|---|---|---|---|---|
| CATALYST (pbw) | (a) 2.5 | | | (b) 3.5 | | | (b) 3.5 | | | (b) 3.5 | | |
|  | A | B | D | A | B | D | A | B | D | A | B | D |
| Cream time (secs.) | 10 | 10 | 13 | 13 | 14 | 18 | 13 | 14 | 14 | 12 | 12 | 13 |
| Gel time (secs.) | 27 | 27 | 29 | 33 | 36 | 43 | 28 | 32 | 35 | 27 | 28 | 30 |
| Tack-free time(secs.) | 31 | 33 | 33 | 39 | 45 | 50 | 35 | 37 | 43 | 33 | 34 | 37 |
| Rise time (secs.) | 53 | 61 | 55 | 60 | 70 | 77 | 65 | 62 | 66 | 48 | 55 | 62 |
| Percent loss | | | | | | | | | | | | |
| Cream time | — | 0 | 30 | — | 8 | 38 | — | 8 | 8 | — | 0 | 8 |
| Gel time | — | 0 | 7 | — | 9 | 30 | — | 14 | 25 | — | 4 | 11 |
| Tack-free | — | 6 | 6 | — | 15 | 28 | — | 6 | 23 | — | 3 | 12 |
| Rise time | — | 15 | 4 | — | 19 | 28 | — | 13 | 20 | — | 15 | 29 |

A = initial
B = after 7 days
D = after 14 days
DMAEM = dimethylaminoethyl methacrylate
(a) = 20% triethylene diamine - 80% dimethylethanolamine
(b) = 33% triethylene diamine - 67% dipropylene glycol

TABLE 4

| STABILIZER | DMAEM 1.0 | | | DMAEM 3.0 | | | DMAEM 5.0 | | | DMAEM 1.0 | | | DMAEM 3.0 | | | DMAEN 5.0 | | |
|---|---|---|---|---|---|---|---|---|---|---|---|---|---|---|---|---|---|---|
| (pbw) | (c) 4.5 | | | (c) 4.5 | | | (c) 4.5 | | | (d) 2.0 | | | (d) 2.0 | | | (d) 2.0 | | |
| (pbw) | A | B | D | A | B | D | A | B | D | A | B | D | A | B | D | A | B | D |
| Cream time (secs.) | 13 | 13 | 13 | 12 | 12 | 12 | 12 | 12 | 10 | 10 | 12 | 12 | 10 | 11 | 10 | 10 | 10 | 9 |
| Gel time (secs.) | 37 | 36 | 36 | 34 | 33 | 39 | 30 | 29 | 28 | 25 | 28 | 31 | 24 | 26 | 29 | 23 | 23 | 24 |
| Tack-free (secs.) | 45 | 44 | 42 | 38 | 38 | 39 | 37 | 33 | 33 | 30 | 39 | 37 | 38 | 31 | 33 | 25 | 28 | 29 |
| Rise time (secs.) | 71 | 73 | 69 | 63 | 66 | 64 | 61 | 57 | 58 | 47 | 55 | 64 | 46 | 51 | 54 | 41 | 48 | 51 |
| Percent loss | | | | | | | | | | | | | | | | | | |
| Cream time | — | 0 | 0 | — | 0 | 0 | — | 0 | 0 | — | 20 | 20 | — | 10 | 0 | — | 0 | 0 |
| Gel time | — | 0 | 0 | — | 0 | 0 | — | 0 | 0 | — | 12 | 24 | — | 8 | 21 | — | 0 | 4 |
| Tack-free | — | 0 | 0 | — | 0 | 3 | — | 0 | 0 | — | 13 | 23 | — | 11 | 18 | — | 12 | 16 |
| Rise time | — | 3 | 0 | — | 5 | 2 | — | 0 | 0 | — | 17 | 36 | — | 11 | 17 | — | 17 | 24 |

(c) = dimethylaminoethyl morpholine
(d) = C-methyl triethylene diamine

In preparation of the activity-stabilized premix compositions of the invention only the usual amounts of tertiary amine catalyst need be employed as in the known formulations for rigid cellular polyurethane products. The total amount of catalyst plus vinyl stabilizer, in general, will comprise 5.5 to 7.5 parts per hundred parts of chlorinated polyol in the premix composition.

What is claimed is:

1. A stabilized premix composition for preparation of fire retardant polyurethane foam by reaction with a tertiary amine polyurethane catalyst and an organic isocyanate, said composition being stable as to deactivation of said catalyst and comprising: a halogenated polyol, said catalyst, and a stabilizing amount of a vinyl monomer compound, said monomer being a condensation product of acrylic or methacrylic acid with an alcohol or amine.

2. A stabilized premix composition as defined in claim 1 wherein said vinyl monomer compound corresponds to the formula from the group consisting of

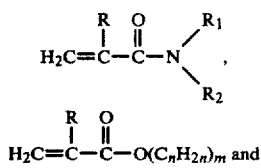

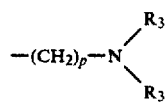

wherein R is H or CH$_3$; R$_1$ is H, an alkyl radical of 1 to 4 carbon atoms, a hydroxyalkyl radical of 2 to 3 carbon atoms or a substituted aminoalkyl group of the formula

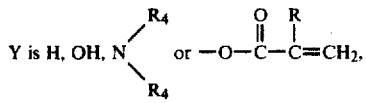

wherein each R$_3$ is independently an alkyl radical of 1 to 4 carbon atoms, or a hydroxyalkyl radical of 2 to 3 carbon atoms and p is 2 to 4;

Y is H, OH, N$\begin{matrix}R_4\\ \\R_4\end{matrix}$ or $-O-\overset{O}{\underset{\|}{C}}-\overset{R}{\underset{|}{C}}=CH_2$, wherein each R$_4$ is independently an alkyl radical of 1 to 4 carbon atoms m is 1 and n is 1 to 12; provided that n is 2 when Y is OH or

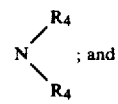

B is hydrogen or an alkyl radical of 2 to 4 carbon atoms, r is 3 or 4, t being zero when r is 4 and t being one when r is 3.

3. A stabilized premix composition as defined in claim 1 wherein said vinyl monomer is dimethylamino ethyl acrylate.

4. A stabilized premix composition as defined in claim 1 wherein said vinyl monomer is dimethylamino ethyl methacrylate.

5. A stabilized premix composition as defined in claim 1 wherein said vinyl monomer is isobutyl methacrylate.

6. A stabilized premix composition as defined in claim 1 wherein said tertiary amine catalyst is dimethylethanolamine.

7. A stabilized premix composition as defined in claim 1 wherein said halogenated polyol is a chlorinated polyether polyol having a hydroxyl number of about 365 ± 10 and containing about 47% by weight of chemically bound chlorine.

8. A stabilized premix composition for preparation of fire retardant polyurethane foam by reaction with organic isocyanate, said composition comprising in parts by weight:

| halogenated polyether polyol | 100 |
|---|---|
| chlorofluorocarbon blowing agent | 45 |
| dimethylethanolamine | 3.5 |
| vinyl monomer | 2 to 4 | said vinyl monomer corresponding to a formula from the group consisting of

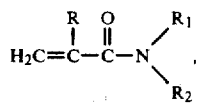

-continued

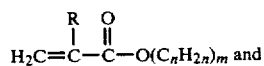

wherein R is H or CH₃; R₁ is H, an alkyl radical of 1 to 4 carbon atoms or a hydroxyalkyl radical of 2 to 3 carbon atoms; R₂ is an alkyl radical of 1 to 4 carbon atoms, a hydroxyalkyl radical of 2 to 3 carbon atoms or a substituted aminoalkyl group of the formula

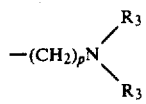

wherein each R₃ is independently an alkyl radical of 1 to 4 carbon atoms or a hydroxyalkyl radical of 2 to 3 carbon atoms, and p is 2 to 4;

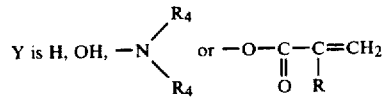

wherein each R₄ is independently an alkyl radical of 1 to 4 carbon atoms m is 1, and n is 1 to 12; provided that n is 2 when Y is OH or

B is hydrogen or an alkyl radical of 2 to 4 carbon atoms, r is 3 or 4, t being zero when r is 4 and t being one when r is 3.

9. Stabilized premix composition as defined in claim 8, further containing 20 parts of an amino polyol for reducing surface friability of polyurethane foam, said amino polyol having a hydroxyl number of 600±10 and a viscosity of 280 cps at 25° C.

10. Stabilized premix composition as defined in claim 9, further containing a cell-stabilizing siloxane compound.

11. A stabilized premix composition as defined in claim 1 wherein said tertiary amine catalyst is dimethylaminoethyl morpholine.

* * * * *

UNITED STATES PATENT AND TRADEMARK OFFICE
CERTIFICATE OF CORRECTION

PATENT NO. : 4,239,642  
DATED : December 16, 1980  
INVENTOR(S) : Harry V. DePaul et al.

Page 1 of 2

It is certified that error appears in the above—identified patent and that said Letters Patent is hereby corrected as shown below:

Column 1, Line 64, formulae (II)
   After "m" insert --Y--

Column 1, Line 65
   Insert $--(H_2C=\underset{\underset{R}{|}}{\overset{\overset{O}{\|}}{C}}-C-OCH_2-)_r C-B_t \ (III)--$ Column 7, Table 4
   Insert under first "pbw" --CATALYST--

Column 7, Line 48, in formulae
   After "m" and before "and" insert --Y--

Column 7 Line 49
   Insert $--(H_2C=\underset{\underset{R}{|}}{\overset{\overset{O}{\|}}{C}}-C-OCH_2-)_r C-B_t--$

UNITED STATES PATENT AND TRADEMARK OFFICE
CERTIFICATE OF CORRECTION

PATENT NO. : 4,239,642                          Page 2 of 2

DATED : 16 December 1980

INVENTOR(S) : Harry V. DePaul and John R. Panchak

It is certified that error appears in the above-identified patent and that said Letters Patent are hereby corrected as shown below:

Column 9, Line 5, in formulae
    After "m" and before "and" insert --Y--

Column 9, Line 7

Insert -- $(H_2C=\underset{\underset{2}{|}}{\overset{\overset{R}{|}}{C}}-\overset{\overset{O}{\|}}{C}-OCH_2-)_r C-B_t$ --

Signed and Sealed this

*Twenty-fourth* Day of *November 1981*

[SEAL]

*Attest:*

*Attesting Officer*

GERALD J. MOSSINGHOFF

*Commissioner of Patents and Trademarks*